United States Patent [19]
Soros

[11] 3,856,159
[45] Dec. 24, 1974

[54] SHIPSIDE CARGO CONVEYANCE DEVICE

[76] Inventor: Paul Soros, 1102 Oenoke Ridge, New Canaan, Conn.

[22] Filed: Oct. 16, 1972

[21] Appl. No.: 297,650

Related U.S. Application Data

[63] Continuation of Ser. No. 84,662, Oct. 28, 1970, abandoned.

[52] U.S. Cl..................... 214/14, 198/118, 198/125
[51] Int. Cl............................................ B65g 63/04
[58] Field of Search............ 214/15, 15 D, 15 E, 14, 214/10, 42 R, 42 B; 198/118, 125

[56] References Cited
FOREIGN PATENTS OR APPLICATIONS
479,470  7/1929  Germany .............................. 214/14
115,075  4/1942  Australia .......................... 214/15 E Primary Examiner—Frank E. Werner
Attorney, Agent, or Firm—Hubbell, Cohen & Stiefel

[57] ABSTRACT

A shiploading device comprising a pivotable elongate bridge support structure having its cargo transference end linearly movable alongside a docked cargo vessel. The invention is particularly characterized in the mounting for the opposite end of the bridge which permits pivotal motion thereof concurrently with linear motion of the cargo transference end alongside the docked vessel.

4 Claims, 6 Drawing Figures

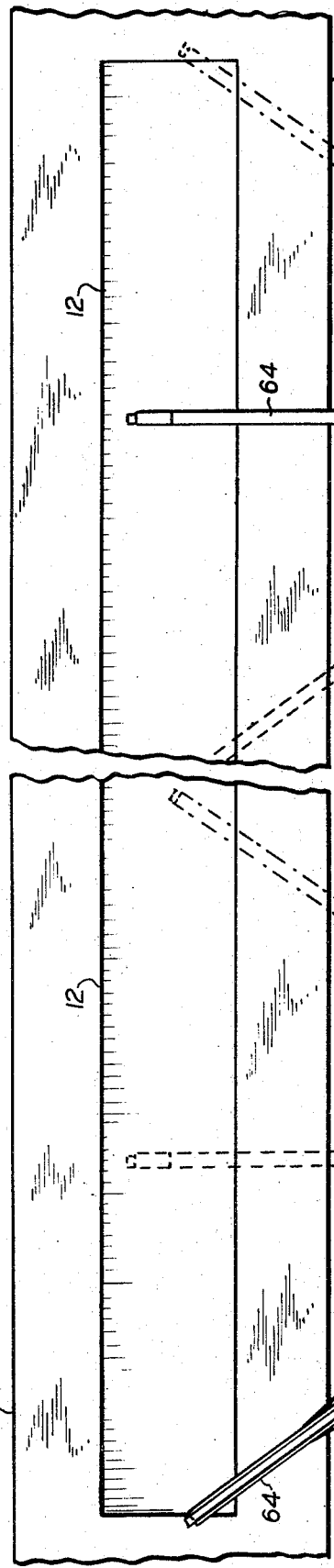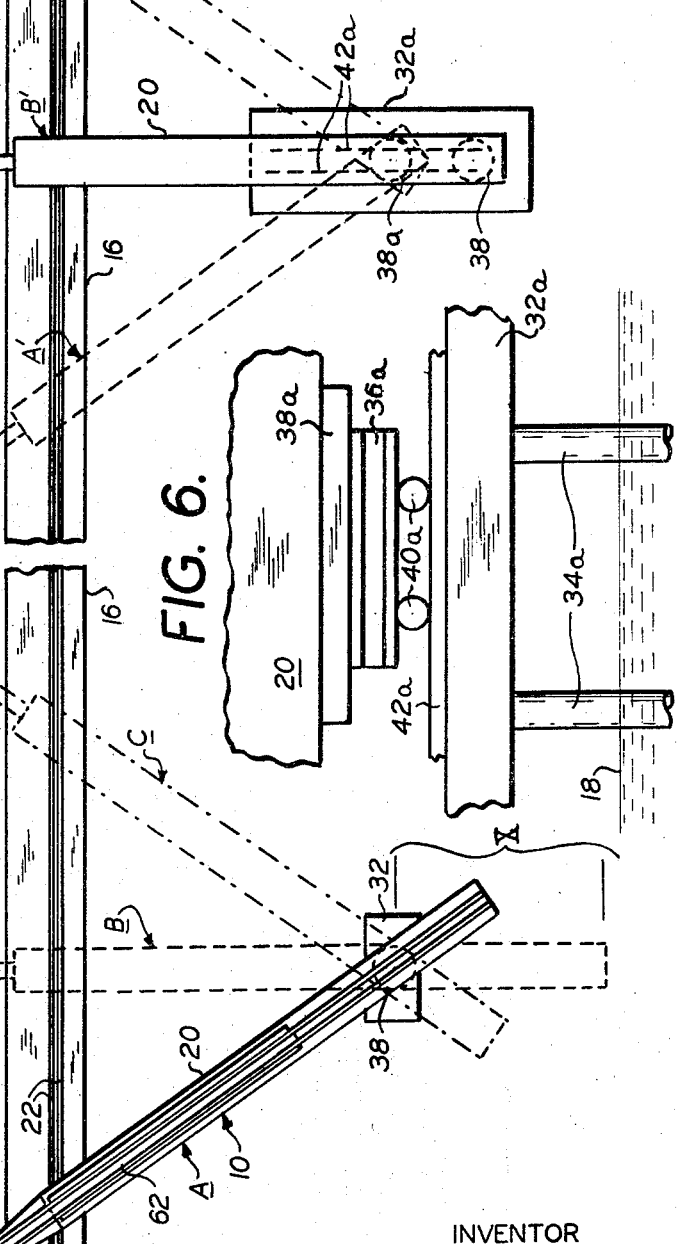

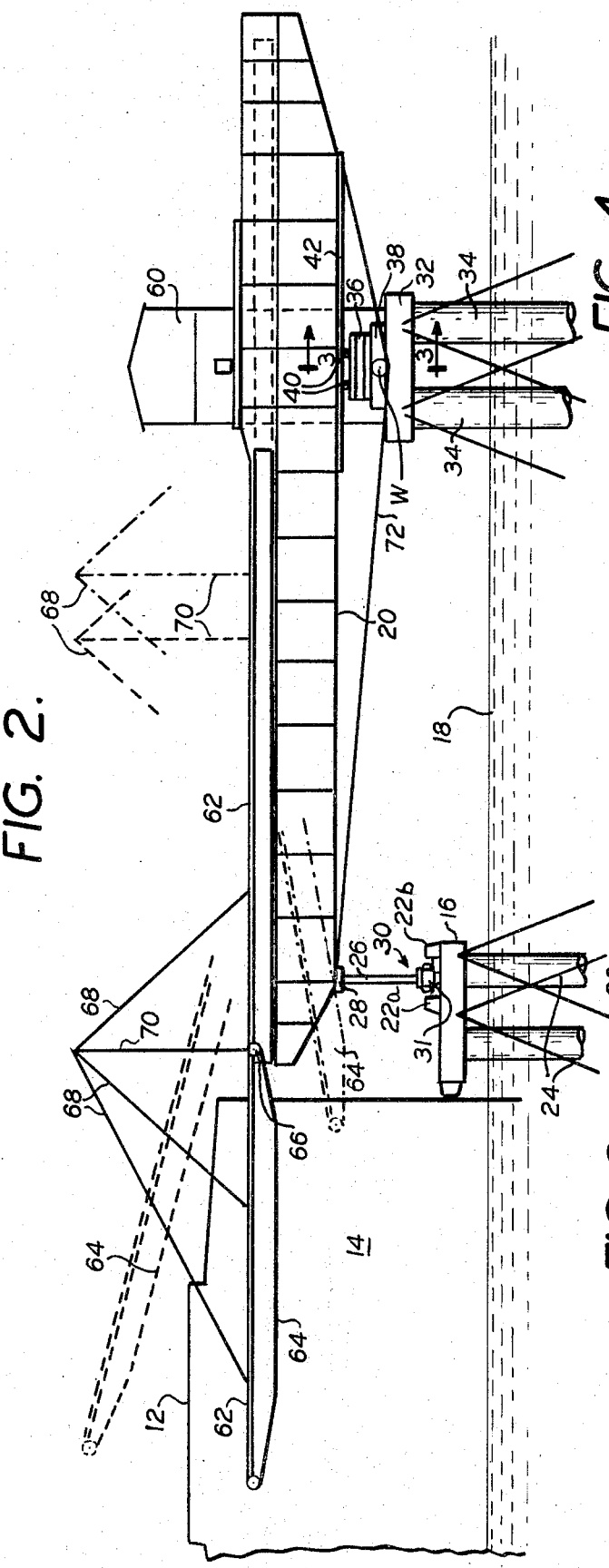
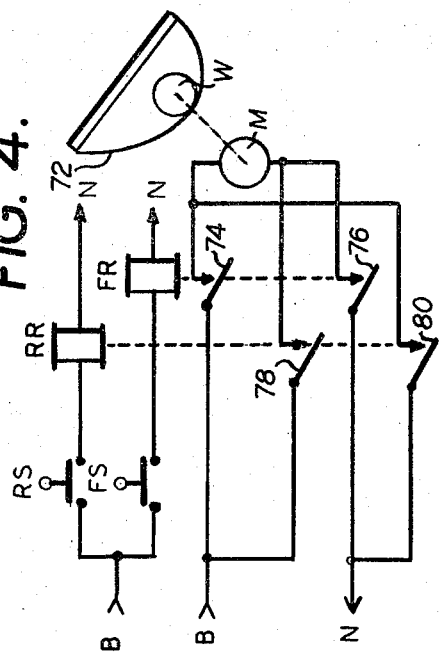

SHIPSIDE CARGO CONVEYANCE DEVICE

RELATED APPLICATION

This application is a continuation of my earlier filed application Ser. No. 84,662 filed by me on Oct. 28, 1970 and now abandoned.

BACKGROUND OF THE INVENTION

1. Field of the Invention

The present invention relates to shiploading apparatus, and more particularly to dockside equipment for conveying cargo to and from a docked vessel.

2. Discussion of the Prior Art

Large dockside shiploading equipment of the type contemplated by the present invention usually involves extensive construction of systems which are massive in size and which must withstand heavy loads and stresses. In each case, some form of docking structure is required involving construction of underwater support systems. Additionally, depending upon the type and manner of operation of the individual loading system, large conveying equipment is required which also involves significant cost and complex, sometimes massive, engineering and construction capabilities.

The size of the ships to be loaded is a significant factor in determining the complexity and size of the loading equipment. Ship tonnage is a significant factor, but ship length can be of greater importance since it determines the distance across which loading apparatus must operate. Cargo is usually loaded in one of a number of holds of a ship extending from the stem to the stern of the ship. Accordingly, the loading equipment must possess the capability of conveying the cargo to be loaded from a cargo source to one of a number of holds extending across a distance approximately equal to the stem-to-stern length of the ship. Furthermore, since the shiploading occurs while the ship is docked and afloat, wind and tidal forces can create significant stresses upon loading equipment and add complications to the loading process. Dock structures can require large, deep foundations or piles and the loading equipment itself would have to be strengthened or designed to withstand greater stress.

Accordingly, it will be apparent that the flexibility to enable carriage of cargo which can involve significant weight, and to enable random delivery and removal of such cargo to and from any one selected hold of a number of such holds extending across a ship's length is a formidable capability particularly if accomplished without prohibitive construction cost and complexity.

SUMMARY OF THE INVENTION

Briefly, the present invention may be described as a device for conveying cargo relative to a cargo receptacle location comprising elongated structural means having a first and a second end, means mounted proximate said first end enabling cargo transference between said device and said receptacle location, means including guide means supporting said elongated means proximate said first end for movement thereof along a generally linear path alongside said cargo receptacle location, means pivotably supporting said elongated means proximate said second end, and means enabling pivotal motion of said elongated means upon said pivotal support means when said first end is moved in said linear path alongside said receptacle location.

By a more detailed aspect of the invention, the means enabling pivotal motion of the elongated means when the first end is linearly moved include means enabling longitudinal relative motion between the elongated means and the pivotal support means. Alternatively, said means enabling pivotal motion may include means enabling movement of said pivotal support means in a direction transversely of the linear path of said first end.

BRIEF DESCRIPTION OF THE DRAWINGS

The present invention may be better understood by reference to the following detailed description of a preferred embodiment thereof taken in connection with the accompanying drawings wherein:

FIG. 1 is a schematic plan view of a cargo conveyance arrangement embodying the present invention;

FIG. 2 is a side elevation of a device structured in accordance with the principles of the present invention;

FIG. 3 is a fragmented sectional view of an alternative structural arrangement for the rear end support of the device shown in FIG. 2;

FIG. 4 is a schematic diagram of a control mechanism operable to provide a power assist in the operation of the invention;

FIG. 5 is a schematic plan view of a cargo conveyance arrangement comprising an alternative embodiment of the present invention; and FIG. 6 is a fragmented side elevation of the supporting structure shown in the bottom end of FIG. 5.

Referring now in detail to the drawings, wherein like reference characters designate similar elements, there is shown in FIG. 1 a cargo conveyance device 10 structured in accordance with the principles of the present invention arranged alongside a cargo receptacle location 12 which is schematically designated to extend along the length of a vessel 14, or other appropriate cargo related site. The vessel 14 is shown docked alongside a docking structure 16 and afloat in water 18. Cargo to be loaded or unloaded is transmitted relative to the receptacle location 12, which may conventionally comprise a plurality of spaced cargo holds (not shown), by operation of the conveyance device 10.

The conveyance device 10 comprises a bridge 20 which is essentially an elongated structural element supported proximate both its ends. At its first or forward end the elongated bridge 20 is supported for linear motion upon rails 22 which are mounted to extend along the length of the docking structure 16. The docking structure 16 is supported above water 18 by foundation piles 24 which extend beneath the surface of the water 18 in a conventional manner to provide the necessary support for the docking structure 16 and for the forward end of the bridge 20.

A support strut 26 extends at the forward end of bridge 20 between a forward pivotal connection 28 and a track engagement mechanism 30, with the entire forward assembly being operative to enable linear motion of the forward end of the bridge 20 along the rails 22 which, as will be more fully explained hereinafter, will result in relative pivotal motion through the forward pivotal connection 28 between the forward end of the bridge 20 and the track engagement mechanism 30. The mechanism 30 includes an electric motor 31 which provides power to drive the forward end of the bridge 20 in either direction along the tracks 22. Alternative power means, such as a separate rail car or other device within the knowledge of those skilled in the art, may be provided to effect locomotion along rails 22.

The rear or second end of the bridge 20 is supported upon a pedestal 32 having foundation piles 34 which extend to beneath the surface of water 18 to provide appropriate structural support in a conventional manner maintaining the pedestal 32 above the surface of the water 18 and providing an adequate support structure for the rear end of bridge 20. The pedestal 32 has mounted thereon a turntable 38 rotatably supporting a spindle 36. The bridge 20 is supported upon the spindle 36 through wheels 40 engaged upon rails 42 located upon the underside of the bridge 20 and extending longitudinally therealong.

Located at the rear end of the bridge 20 is a transfer tower 60 from which cargo to be loaded or unloaded is delivered or removed. The tower 60 is in communication with an endless belt conveyor mechanism 62 which extends between the tower 60 and a boom 64 cantilevered from the forward end of the bridge 20 and supported by a boom pin 66 and a series of support struts 68 which extend from the top of a boom mast 70.

The boom 64 operates as a cargo transmission mechanism whereby cargo is transferred between the cargo receptacle location 12 and the conveyance device 10 of the present invention. Furthermore, the boom 64 is rotatable about the boom pin 66 and may be raised or lowered as indicated by the dotted representation thereof shown in FIG. 2. The entire structure including the boom 64 and the boom mast 70 may be mounted in a conventional manner upon a shuttle device (not shown) which travels longitudinally along the bridge 20. In this manner, the boom 64 may be actuated forwardly or rearwardly along the bridge 20 thereby enabling variation of the reach whereby boom 64 extends beyond the forward end of the bridge 20. The rearmost positions of the boom 64 are indicated by the dotted designations for the boom mast 70 and the struts 68 in FIG. 2.

In the operation of the device of the present invention, cargo handling may occur at any point along the length of the cargo receptacle location 12 by movement of the forward end of the bridge 20 in a linear path along the tracks 22. In FIG. 1, the conveyance device 10 is shown in a solid-line configuration to be in a specific position labelled A relative to the cargo receptacle 12 with two other positions, designated B and C, shown in dotted form. As the conveyance device 10 is moved from position A to position B the entire bridge structure 20 will be pivoted about the pivotal support structure 38. It will also be apparant that as this occurs, the distance between the point at which the bridge 20 engages the rails 22 and the pivotal support 38 will vary. Moving from position A to position B this distance will decrease whereas when the conveyance device 10 is moved from position B to position C this distance will once again increase. Accordingly, it will be seen that the length of the portion of the bridge 20 which extends between tracks 22 and pivotal support 38 must vary as the bridge 20 is pivoted about the point 38 for linear motion of its forward end along tracks 22.

The mechanism whereby this alteration in the effective length of the bridge 20 occurs is shown most clearly in FIG. 2 and comprises the wheels 40 and the rails 42 which permit relative longitudinal motion between the pivotal support 38 and the bridge 20. As the bridge 20 pivots upon turntable 38 with its forward end moving linearly along tracks 22, relative longitudinal motion of the bridge 20 will be enabled as a result of the engagement of the tracks 42 upon the wheels 40. The degree of this relative motion will be most clearly perceived in FIG. 1 which shows the bridge 20 to overhand the turntable 38 by an approximate distance labeled X when the bridge is in the central position B. With the bridge in either position A or C it will be apparent from FIG. 1 that the length of the rearmost portion of the bridge overhanging the turntable 38 will be less.

As the forward end of the bridge 20 moves linearly with the mechanism 30 being guided along the dock 16 by the rails 22, there will be developed a thrust upon the bridge which causes the bridge to slide upon the wheels 40 engaged upon rails 42. As the bridge 20 pivots between position A and position B, this thrust will be directed rearwardly and there will occur longitudinal relative motion of the bridge upon the turntable 38. In this manner, the length of bridge structure which extends between the tracks 22 and the turntable 38 will be varied as the bridge 20 is swung from one cargo receptacle location to another along the length of the vessel 14.

Reversal of the direction of movement of the bridge 20, i.e. motion from position B to either positions A or C, will result in forwardly directed thrust and longitudinal motion of the bridge relative to the turntable 38 in the opposite direction whereby the amount of overhang X rearwardly of the pedestal 32 will be diminished.

It will be apparent that operation of the conveyance device 10 of the present invention in the manner described will enable motion of the boom 64 longitudinally along the cargo receptacle location 12 so that the distance between the boom end 66 and the furthest reach of cargo receptacle location that must be serviced is generally maintained constant. Accordingly, the cantilevered distance of the boom 64 relative to the cargo receptacle location may also be maintained constant except for shuttling of the boom 64 upon the bridge 20 as desired to reach cargo holds which may be spaced different distances from dock 16. Such shuttling might occur where it is desired to reach various locations across the width of the cargo receptacle location 12. By maintaining the end of the bridge 20 a fixed distance relative to the docked vessel 14, there is avoided a situation where increasing the distance between the end of the bridge 20 and the vessel 14 would result in a requirement for a longer cantilevered distance for the boom 64. Such a situation would occur, for example, in an arrangement where the tracks 22 are formed in a curved configuration to enable pivoting of the bridge 20, without longitudinal motion relative to its pivotal support. It will be seen that such an arrangement will increase stresses upon the system due to the lengthened cantilever boom and will require more expensive and elaborate support structures thereby increasing the depth and size of the piles 24 which are needed.

Furthermore, by providing the ability to alter the length of the bridge 20 extending between dock 16 and the pivotal support upon pedestal 32, there is avoided a rigid structure which might be damaged or unduly stressed by the action of wind or tides. If the bridge 20 were constructed with a rigidly fixed length between the pedestal 32 and the dock 16, stresses created by waves, tidal forces or wind would have to be absorbed within the bridge structure itself or would require substantial increase in the strength of the entire loading system in order to avoid damage by the forces created. With the system of the present invention, any shifting in distance between the dock 16 and the pedestal 32 may be readily absorbed through the mechanism interconnecting the turntable 38 with the bridge 20 which permits relative longitudinal motion between the bridge 20 and its pivot point provided by the turntable 38.

The increased flexibility of the present invention may be better understood by comparing the present invention to presently known shiploading conveyors which involve a traveling dock conveyor whereby the cargo to be loaded is fed from either of two directions along the dock. Such a situation, for example, will arise where cargo to be loaded upon a vessel 14 is introduced from the ends of the dock 16 and conveyed therealong in a longitudinal direction until a point alongside the cargo receptacle location 12 was reached whereupon the cargo was deposited into hold in the cargo receptacle location 12. In such a system, if it was decided to reverse the travel direction of the cargo, it would be necessary to back up the entire dock and all the cargo contained thereon in order to reverse the travel direction of the forwardmost cargo item. With the device of the present invention, cargo is introduced through the transfer tower 60 and, accordingly, the bridge 20 may be pivoted to any one of a plurality of locations along the length of the vessel 14 in random fashion without there occuring any reversal of the direction of travel of the rearmost cargo. Accordingly, with the present invention there is avoided the necessity for sequential loading of a vessel without introduction of undue disturbances in the flow of cargo through the system.

It will be apparent that the present invention relates to and involves structures which are rather massive in size and which involve significant weight and stress. Accordingly, when the bridge 20 is driven along the tracks 22 it will be clear that the stress developed upon the dock 16 will operate to apply a longitudinal force to the bridge 20 tending to drive it in the longitudinal directions relative to the turntable 38. Depending upon the rotational direction of the pivotal motion of the bridge 20, a force will be developed either against a forward rail 22A or against a rearward rail 22B. As the bridge moves either counterclockwise between positions B and A, or clockwise between positions B and C, there will be generated a force directed forwardly of the bridge 20 with a reaction occuring against the rail 22B. Conversely, when the bridge 20 moves either counterclockwise between positions C and B, or clockwise between positions A and B, a rearward longitudinal force is developed tending to drive the bridge in a direction which causes a reactive force against the front rail 22A. In order to minimize the effects of these forces and to offer a power-assisted drive for longitudinal motion of the bridge there may be optionally provided a winch W driven by a motor M and having a cable 72 extending about the winch W and to both the forward and rearward ends of the bridge 20. In this fashion, rotation of the winch W will drive the cable 72 to apply a power-assisted force to move the bridge in either of two directions longitudinally relative to the pedestal 32. The system whereby this power assist is accomplished may be conventional and provided within the knowledge of anyone skilled in the art. An example of a control system for effecting such a power assist is shown schematically in FIG. 4.

In the system of FIG. 4 a pair of switches labeled RS and FS are connected to sense the direction of travel desired for the bridge 20. The switches RS and FS may be placed in any appropriate location where sensing the direction of bridge travel might occur. For example, for forward bridge travel, the switch FS could be placed between the mechanism 30 and the rear track 22B with the switch biased in the open condition. When the bridge 20 is driven in a manner to extend the length thereof between pedestal 32 and dock 16, there would be developed a force between mechanism 30 and rail 22B tending to drive the bridge in a forward direction. When this occurs the switch FS would be driven to a closed condition by the developed force thereby energizing a relay FR which would receive current through the switch FS from a battery terminal B connected through relay FR to a neutral common terminal labeled N. Energization of relay FR will effect closure of switches 74 and 76 thereby connecting the motor M across the terminals B and N with current being applied through the motor M in one direction to drive the winch W and the cable 72 so that a forwardly directed force is applied to the bridge 20. Upon reversal of the direction of bridge travel, the switch RS, which may be located between the mechanism 30 and the rail 22A to operate in the same manner as the switch FS, would be driven from its biased-open condition to a closed condition whereby the relay RR is energized between the terminals B and N. Energization of the relay RR will effect closure of the switches 78 and 80 thereby placing the motor across the terminals B and N in a reverse direction from that previously described by energization of the relay FR. It will be apparent that since the switch FS is biased in the open condition removal of a compressive force between the mechanism 30 and the rail 22B will cause the switch FS to open thereby deenergizing the relay FR and opening the switches 74, 76. With the switches 78 and 80 closed, the polarity of the motor M will be reversed thereby reversing the rotational direction of the winch W and the direction of travel of the cable 72. In this fashion a rearward power assist is applied to the bridge 20 in order to facilitate operation of the device in that direction.

In an alternative embodiment of the present invention, the means whereby longitudinal motion of the rear or second end of the bridge 20 is enabled may be altered within the scope and purview of the present invention. Such an alternative structure for supporting the rear end of the bridge 20 is shown in FIGS. 5 and 6. In this alternative embodiment, the forward end of the bridge 20 remains unchanged from the configuration depicted in FIGS. 1 and 2, with the only structural differences being related to the rear or pivoted end of the bridge.

Referring to FIG. 5, the rear end of the bridge 20 is shown supported upon an elongated pedestal 32a having pile members 34a extending to beneath the surface of the water 18 to maintain the pedestal 32a fixed at an appropriate level. On the upper side of the pedestal 32a, and running longitudinally therealong, there is affixed a pair of rails 42a upon which are mounted in rolling engagement a pair of wheel members 40a, connected to the bridge 20 through a spindle 36a and a turntable 38a whereby the bridge 20 is pivotally supported relative to the pedestal 32a.

In the operation of the embodiment depicted in FIGS. 5 and 6, when the forward end of the bridge 20 is to be moved linearly along the rails 22, the rear end of the bridge will move longitudinally along the rails 42a while being simultaneously pivoted relative to the pedestal 32a through the pivotal supporting connection provided by the spindle 36a and the turntable 38a. Thus, the pivotal connection provided by the turntable 38a will remain fixed relative to the bridge 20, with the entire assembly being movable by means of the rolling engagement of the wheels 40a upon the rails 42a longitudinally along the pedestal 32a when the forward end of the bridge 20 is moved linearly alongside the cargo receptacle location 12. Thus, with the bridge 20 in either of the locations labeled A' or C', depicted in dotted form in FIG. 5, the rear end assembly of the bridge 20, including the turntable 38a, the spindle 36a and the wheels 40a, will be moved along the rails 42a to a point forwardly of the pedestal 32a closest to the rails 22. Conversely, when the bridge 20 is moved from either of the positions A' or C' to the position labeled B', the entire rear end assembly of the bridge 20 will be moved rearwardly along the rails 42a to a rearmost position upon the pedestal 32a.

It will be clear that the combined motion of the rear end assembly of the bridge 20 upon the track 42a, and the relative pivotal motion of the bridge 20 enabled by the pivotal supporting connection comprising spindle 36a and turntable 38a, will enable the forward end of the bridge 20 to move linearly along the rails 22 in much the same manner as was described in connection with the embodiment of FIG. 1. Furthermore, it will be apparent that the only basic distinction between the device depicted in FIG. 1 and that depicted in FIG. 5 is that in FIG. 1 the pivotal support means are fixed relative to the pedestal 32 and to the rails 22, with the bridge 20 being longitudinally movable relative to said pivotal supporting member, while in the device of FIG. 5 the pivotal supporting means not only permits pivotal motion of the bridge 20 but also itself moves relative to the rails 22 in a direction transversely thereof.

A basic operational distinction which will exist between the embodiments of FIG. 1 and FIG. 5 relates to the cargo transference equipment which is provided at the rear or pivoted end of the bridge 20. In the embodiment of FIG. 1, cargo may be introduced to the conveyance device through the transfer tower 60 which is located at the pivot point of the bridge 20. Since this pivot point remains longitudinally unchanged, cargo may be continuously introduced from a fixed location of the tower 60. However, in the embodiment of FIG. 5 the rear end of the bridge 20 is longitudinally movable and, accordingly, no fixed pivot point exists through which cargo may be introduced in the same manner as in the embodiment of FIG. 1. Accordingly, a potential disadvantage of the approach depicted in FIG. 5 may be that some more complex cargo transference equipment may be required at the rear end of the bridge 20 in order to accommodate for the longitudinal motion of the pivot point of the bridge.

Another important modification of the invention, shown most clearly in FIG. 3, is particularly suitable for utilization with the specific embodiment depicted in FIG. 1 wherein the bridge 20 is longitudinally movable relative to its pivotal support. The alternative depicted in FIG. 3 basically involves structure which can be utilized to replace the function performed by the wheels 40 and the rails 42. The modification of FIG. 3 may be mounted upon the pedestal 32 and it may comprise a spindle 50 having a turntable 52 rotatably mounted thereupon. The turntable 52 has afixed thereon a U-shaped frame member 54 which extends longitudinally along the bridge 20, i.e. in a direction perpendicular to the drawing as shown in FIG. 3, to provide relative sliding support therewith. Mounted within the inner regions of the U-shaped member 54 is a series of rollers engaging the bridge 20 for slidable relative motion therebetween. At the base of the frame member 40, a horizontal roller 56 is rotatably mounted upon bearings 58 with the bridge 20 shown in dotted form supported thereabove and in rolling engagement therewith. A pair of upright rollers 60 and 62 are rotatably mounted on opposite sides of the U-shaped frame member 54 by bearings 64 and 66 supported from the sides of the U-shaped member 54. The upright rollers 60 and 62 slidably support the bridge 20 on the vertical sides thereof, and it will be apparent that as the bridge 20 is rotated for pivotal motion upon the spindle 50, the requirement for linear travel along the tracks 22 will cause forces to be exerted upon the bridge which will drive the bridge longitudinally with relation to the pivot point provided by the spindle 50 and the turntable 52. Thus, as the U-shaped frame member 54 rotates upon the pedestal 32, the bridge 20 will be slidably engaged by the rollers 60, 62 and 56 and will move longitudinally relative to its pivot point in the same manner as described in connection with the embodiment of the invention depicted in FIGS. 1 and 2. In general, the operation of a device constructed in accordance with the configuration of FIG. 3 will be basically the same in principle as the operation of the device constructed as shown in FIGS. 1 and 2, with the only difference being that different structural means are provided to enable the relative longitudinal motion between the bridge 20 and its pivot point provided upon the pedestal 32.

Although in the forgoing the present invention has been described in connection with a preferred embodiment thereof, it will be apparent that many alterations and modifications of the specific structure described may be effected within the spirit and scope of the present invention and it is to be understood that all such modifications within the knowledge of those skilled in the art are considered to be within the scope and purview of the present invention.

What is claimed is:

1. A device for loading a ship moored in a predetermined longitudinal orientation, said ship having longitudinally aligned cargo receiving means, an elongated structure for supporting conveyor means, said structure having a first shipside end and a second end remote from said shipside, means mounted proximate said first end enabling cargo transference between said device and said ship cargo receiving means, means including guide means supporting said elongated structure proximate said first end for movement thereof along a generally straight line path alongside and substantially parallel to the longitudinal axis of a ship moored in said predetermined orientation, said support means further including a pivot whereby said first end is movable pivotally and lineraly in the direction of the axis of said ship, a support for said second end, said support for said second end including means for permitting the pivotal movement of said elongated structure about said support for said second end between two extreme positions, said pivot for said second end being spaced from said guide means by a distance less than the length of said elongated member when said elongated member is in one of said extreme positions, and means enabling longitudinal movement of said elongated structure relative to said support for said second end, whereby as said first end is moved along said straight line path, said second end of said elongated structure moves both pivotally and longitudinally toward and away from said straight line path.

2. A device according to claim 1 wherein both said pivotal supporting means are longitudinally fixed relative to said elongated means.

3. A device according to claim 1 wherein said pivotal supporting means for said second end are fixed relative to said straight line path.

4. A device according to claim 1 wherein said guide means comprise rail means extending along said cargo receptacle location, said device comprising support means fixed relative to said cargo receptacle location and having said rail means fixedly mounted thereupon.

* * * * *